US011136439B2

(12) United States Patent
Wu et al.

(10) Patent No.: US 11,136,439 B2
(45) Date of Patent: Oct. 5, 2021

(54) METHOD FOR PREPARING MODIFIED THERMOPLASTICS HAVING GERM-REPELLENT PROPERTIES AND A PRODUCT THEREOF, AND A COMPOSITION FOR PREPARING THE MODIFIED THERMOPLASTICS

(71) Applicant: Ka Shui Plastic Technology Company Limited, Kowloong Bay (HK)

(72) Inventors: You Wu, Kowloon Bay (HK); Wai Chung Peter Wong, Kowloon Bay (HK); Cheuk Nang Daniel Sung, Kowloon Bay (HK); Shun Hung Kiang, Kowloon Bay (HK); Kam Fai Cary Wong, Kowloon Bay (HK); Tsz Kin Yu, Kowloon Bay (HK)

(73) Assignee: Kai Shui Plastic Technology Company Limited, Hong Kong (CN)

( * ) Notice: Subject to any disclaimer, the term of this patent is extended or adjusted under 35 U.S.C. 154(b) by 477 days.

(21) Appl. No.: 15/968,731

(22) Filed: May 1, 2018

(65) Prior Publication Data
US 2019/0263981 A1 Aug. 29, 2019

(30) Foreign Application Priority Data

Feb. 27, 2018 (CN) .......................... 201810164854.1

(51) Int. Cl.
*C08J 3/24* (2006.01)
*C08J 3/20* (2006.01)
(Continued)

(52) U.S. Cl.
CPC .............. *C08J 3/246* (2013.01); *A01N 25/00* (2013.01); *A01N 31/02* (2013.01); *A01N 31/04* (2013.01);
(Continued)

(58) Field of Classification Search
CPC .... C08J 3/28; C08J 3/22; B29B 13/08; C08K 5/06; A01N 31/02
(Continued)

(56) References Cited

U.S. PATENT DOCUMENTS

| 6,022,553 A * | 2/2000 | Anders ................ A01N 59/02 424/411 |
| 6,261,518 B1 * | 7/2001 | Caputo .................... A61L 2/14 250/455.11 |
| 8,927,616 B2 * | 1/2015 | Thomas .................. A61L 27/50 522/126 |
| 10,030,108 B1 * | 7/2018 | Lau ......................... B29B 7/005 |
| 2009/0118390 A1 * | 5/2009 | Abt ......................... A61L 27/16 523/115 |

FOREIGN PATENT DOCUMENTS

| CN | 101891880 A | * | 11/2010 |
| CN | 102179183 A | * | 9/2011 |

(Continued)

OTHER PUBLICATIONS

Google Patents translation of WO 2007/007521 (2007, 24 pages).*
(Continued)

*Primary Examiner* — Brieann R Johnston
(74) *Attorney, Agent, or Firm* — George G. Wang; Bei & Ocean

(57) ABSTRACT

This disclosure discloses a preparing method of transforming commercial base thermoplastics into germ-repellent resins or functional masterbatch through plasma and (melt) mixing assisted grafting process. The resins or masterbatch concentrate composition enable a number of product reforming processes, including but not limited to thermoforming, profile extrusion, injection molding, blow molding, blow filming, film casting, and spinning into articles of different shapes and geometries or overmolding on plastic substrates that can resist surface adsorption of microbes after solidification.

19 Claims, 3 Drawing Sheets

(51) Int. Cl.
*C08J 3/22* (2006.01)
*A01N 47/20* (2006.01)
*A01N 31/04* (2006.01)
*A01N 31/02* (2006.01)
*A01N 37/00* (2006.01)
*B29B 13/08* (2006.01)
*C08J 3/28* (2006.01)
*A01N 25/00* (2006.01)
*A01N 59/00* (2006.01)

(52) U.S. Cl.
CPC ............. *A01N 37/00* (2013.01); *A01N 47/20* (2013.01); *A01N 59/00* (2013.01); *B29B 13/08* (2013.01); *C08J 3/203* (2013.01); *C08J 3/22* (2013.01); *C08J 3/28* (2013.01); *C08J 2323/02* (2013.01); *C08J 2323/12* (2013.01); *C08J 2325/08* (2013.01); *C08J 2355/04* (2013.01); *C08J 2367/00* (2013.01); *C08J 2375/04* (2013.01); *C08J 2475/04* (2013.01)

(58) Field of Classification Search
USPC ......................................................... 522/129
See application file for complete search history.

(56) References Cited

FOREIGN PATENT DOCUMENTS

| | | | | |
|---|---|---|---|---|
| CN | 107474256 A | * | 12/2017 | |
| DE | 19700079 A1 | * | 1/1998 | ................ C08J 7/18 |
| EP | 1939350 A1 | * | 7/2008 | ............. A01N 43/52 |
| JP | 01193313 A | * | 8/1989 | |
| WO | WO-9215198 A1 | * | 9/1992 | ............. A01N 55/00 |
| WO | WO-2007007521 A1 | * | 1/2007 | ............... A61K 8/44 |

OTHER PUBLICATIONS

Google Patents translation of CN 101891880 (2010, 10 pages).*
Google Patents translation of DE 19700079 (1998, 8 pages).*
Derwent Abstract of JP 01193313 (1989, 2 pages).*
Translation of WO 9215198 (1992, 9 pages).*
Translation of CN 102179183 (2011, 7 pages).*
Translation of CN 107474256 (2017, 4 pages).*
Sigma-Aldrich, Tween 20 (2020, 5 pages).*

* cited by examiner

One-Step Method

Two-Step Method

METHOD FOR PREPARING MODIFIED THERMOPLASTICS HAVING GERM-REPELLENT PROPERTIES AND A PRODUCT THEREOF, AND A COMPOSITION FOR PREPARING THE MODIFIED THERMOPLASTICS

CROSS REFERENCE OF RELATED APPLICATION

This patent application claims the priority to Chinese patent application No. 201810164854.1, filed on Feb. 27, 2018, the disclosure of which is incorporated by reference in its entirety herein.

BACKGROUND OF THE PRESENT DISCLOSURE

Field of Invention

The present disclosure relates to a method for modifying base thermoplastics to reduce surface bacteria attachment thereof while retaining bulk physical properties thereof after a product forming process. Particularly, the present disclosure relates to a method of introducing an appropriate chemical modifier to base thermoplastic granules through plasma treatment, blending/melt mixing, and subsequent plasma treatment to thereby reduce surface microbial attachment of a product produced from the method.

Description of Related Arts

Imparting anti-microbial functionality into plastics is fueled with significance not only for fundamental researches but also for practical applications. Various active ingredients have been reported for their antimicrobial properties. Typical antimicrobials include silver-based nanoparticles, quaternary anime, chitosan, polyphenol, etc. However, people also become increasingly concerned about safety of the antimicrobials. For example, it has been reported that silver nanoparticles may traverse into the brain and induce neuronal degradation and necrosis over a long period of time. Another report reveals that Nano silver poses a risk of mutating fish embryos. Additionally, bacteria over-exposed to antibiotics/antimicrobials are easily mutated and become drug resistant. Public health officials from Nevada reported a case of a woman who died in Reno in September (2016) from an incurable infection. Testing showed the superbug that had spread throughout her system could fend off 26 different antibiotics.

It is strongly desired to convert conventional anti-microbial to a safe, non-leachable and non-fouling method that may repel the attachment of bacteria, rather than killing them. Earlier fundamental researches show that surface energy of a substrate definitely plays an important role. Minimal long-term adhesion of microbes is associated with surfaces having initial surface tensions between 20 and 30 mN/m, i.e. low-energy surface. Silicones and fluoropolymers are two well-known antifouling organic compounds having been used as the essential coating ingredients due to their low surface energies. Polyethylene glycol coating is also widely used as an antifouling modifier due to its hydrophilicity and steric hindrance to various kinds of biofluids (such as proteins, bacteria, and viruses). Conventional antifouling modification of polymers is usually achieved by surface modification and coating with hydrophilic layers on the polymeric surfaces after molding. All of the above can be demonstrated in a number of disclosures as follows.

CN102942708 discloses a wet-chemical method to obtain surface hydrophilic polypropylene material in the form of film, mesh, wire, particles or microspheres, by grafting a monomeric maleic anhydride onto a polypropylene and then polyethylene glycol onto the maleic anhydride. This is yet a surface modification process on a preform of polypropylene material to impart an antifouling property.

WO2016110271 discloses a built-in modification method, which imparts antimicrobial properties to a polymer by causing a product surface to be microbial repellent with an antifouling agent. The antifouling agent is selected from a hydrophilic forming group consisting of one or more of polyol, polyoxyether, polyamine, polycarboxylate, polyacrylate, polyvinylpyrrolidone, polysaccharide, Zwitterionic polyelectrolyte, a copolymerized system of polymer segments of mixed charges and/or an interpenetrating blend mixture of cationic and anionic polymers. The agent has to be blended with the base polymer and to react with maleic anhydride on a polymer carrier as a coupling linker.

Unlike above linker-related approaches, in which the non-fouling modifiers need to be physically blended or chemically grafted to polymer backbones with the assistance of linkers, which involve multiple sequence of wet chemistry, toxicity, unpleasant odor and solvent disposal issues, the plasma assisted grafting is green, effective, bio-compatible and environmental friendly. A variety of plasma assisted polymerization approaches have been developed to simplify the process of decorating surfaces with the required chemical groups for immobilization of biomolecules through chemical linkers. Various types of plasma treatment approaches and chemicals have been applied to different polymer surfaces, such as poly(ethylene terephthalate), poly(lactic acid), polypropylene and polyethylene to improve various biomedical performances such as biocompatibility, cell proliferation and non-fouling performance. This can be demonstrated in a number of disclosures as follows.

U.S. Pat. No. 8,927,616 disclose a method of forming an orthopedic implant by the assistant of plasma pre-treatment to the polymer flake and subsequently melt-compounding into a desired shape. The method solely employs plasma-pretreatment to tune the surface properties without grafting of other modifiers to tune the wettability and lubricity. The method also includes blending of antimicrobials to kill bacteria.

US20150010715 disclose a plasma assisted coating of hydrophilic polymer and antimicrobial metallic compound directly on the product.

U.S. Pat. No. 6,096,564 A disclose a method of applying plasma to a surface with biological contamination to form a cross-linked network to resist further adhesion of bacteria and other biomaterials.

CA 2235090 A1 disclose a method employing vacuum $SO_2$ plasma to initiate the grafting of hydrophilic monomers on a surface of final substrate to achieve bacteria repellency.

However, the methods above are either related to the surface grafting on the final products or comprise antimicrobial agents (which kill bacteria). The surface treatment on the final product is a straightforward method to tune the biological properties, but it lacks practical purpose because of higher cost of larger equipment and low productivity. The present disclosure relates to modification of base thermoplastic materials such as granules, flakes and even filaments, such that the modified materials can thus be reformed into various products with built-in and bacteria-repellent performances.

SUMMARY OF THE PRESENT DISCLOSURE

In view of the above, a first aspect of the present disclosure provides a method of modifying thermoplastics, which covalently grafts an bacterial-repellent (non-fouling) moiety onto a backbone of various kinds of polymer resins by plasma-assisted blending/melt mixing. The method comprises: firstly, producing functional groups on a surface of base thermoplastics through plasma treatment; then, mixing the treated base thermoplastics with a modifier in a mixer or through reactive melt extrusion on a screw extruder to produce granular resin with a non-fouling property from a composition comprising said thermoplastic; afterwards, post-treating the particulate resin with plasma, and injection-molding the particulate resin post-treated with plasma to obtain a final product.

The thermoplastics being modified by the present method includes but not limited to homopolymers, copolymers and blends of polyolefins, cyclic polyolefins, acrylics, acetates, styrenics, polyesters, polyimides, polyaryletherketones, polycarbonates, polyurethanes and thermoplastic elastomers. In a preferred embodiment, the thermoplastics being modified by the present method includes but not limited to thermoplastic polyurethane (TPU) and thermoplastic vulcanizate (TPV), styrene ethylene butylene styrene block thermoplastic elastomer (SEBS), polypropylene and polyolefin elastomers (POE), etc. The thermoplastics in the present disclosure may also comprise poly(methyl methacrylate) (PMMA), polystyrene (PS), polyethylene terephthalate (PET), polycarbonate (PC), polymethylpentene (PMP), polysulfone, polyamide (PA), polyvinyl chloride (PVC), styrene acrylonitrile (SAN), styrene-methacrylate based copolymer, polypropylene based copolymer, acrylonitrile butadiene styrene (ABS), polyimide (PI) cellulosic resins, methyl methacrylate butadiene styrene (MBS), etc. Particularly, the base thermoplastics may be in a form of powder, granule, flake and filament.

Particularly, specific conditions for plasma treatment include: the plasma employing atmosphere plasma or vacuum plasma, and/or the plasma being formed from a gas selected from a group consisting of oxygen, argon, nitrogen, carbon dioxide and combinations thereof; and/or duration of plasma treatment ranging from 10 s to 600 s; and/or power of the plasma treatment ranging from 10 W to 1000 W.

As a preferred embodiment of the present disclosure, subsequent to plasma post-treatment, a rinsing process is performed by employing water, ethanol, centrifugation and compressed air to remove an unlinked surface modifier.

The method according to the present disclosure further comprises: blending an antifouling modifier (chemical modifier) with the base thermoplastics and/or without other auxiliary additives prior to or during heat processing of the base thermoplastics, wherein the antifouling modifier (chemical modifier) comprises one or more linear or multi-armed structures of non-ionic surfactants.

The heat processing can be achieved on either a mixer or a single/twin-screw extruder operated within a proper processing temperature range according to different melting temperatures of the base thermoplastics and other main components for modifying the same, e.g. from 80 to 270° C. Additionally, the mixing duration preferably ranges from 60 s to 600 s. In a preferred embodiment, the processing temperature of said melt processing ranges from 170 to 220°

C. After said heat processing, the processed composition is then subjected to cooling, followed by pelletization. The obtained modified thermoplastic resin (masterbatch) is then subjected to injection molding directly or after being mixed with the basic thermoplastic resin (masterbatch concentrate resin), to reform into an article with a desired shape and dimension. Apart from injection molding, other molding methods such as profile extrusion, blow molding, blow filming, film casting, spinning and overmolding said masterbatch or masterbatch concentrate resin on a plastic substrate can also be applied to reform into an article. Preferably, the reformation temperature ranges from 170° to 260°.

A second aspect of the present disclosure relates to a composition for preparing modified thermoplastics (a functional polymer) with an germ-repellent property. Said composition comprises said base thermoplastics (70~99 wt %) as described in the first aspect and hereinafter, chemical or functional modifiers (0.5~29 wt %) and other additives (0.01~1 wt %) such as one or more of an antioxidant, a brightener, a nucleator and an anti-transesterification agent. Said chemical or functional modifier (non-fouling modifier) includes one or more of linear and/or multi-armed structures of non-ionic surfactants.

The non-ionic surfactants adopted in the present disclosure comprise fatty alcohol polyoxyalkylene ethers, polyoxyalkylene fatty acid esters, polyoxyalkylene sorbitan/sorbitol fatty acid esters, polyether glycols and their derivatives. In a preferred embodiment, the non-ionic surfactants comprise one or more of polyoxyethylene sorbitol hexaoleate, polyoxyethylene sorbitan monolaurate, polyoxyethylene hydrogenated castor oil and polyoxyethylene cetyl/stearyl ether. The non-ionic surfactants may also comprise one or more of polyoxyethylene acrylate, polyoxyethylene methacrylate, polyoxyethylene vinyl ethers. The non-ionic surfactants may also comprise one or more of polyoxypropylene glycol, polyoxypropylene amine and polyoxypropylene acrylate, polyoxypropylene methacrylate, polyoxypropylene glycerol ether and their derivatives. Preferably, in the non-ionic surfactants, the polyoxyethylene moiety or polyoxypropylene moiety has a molecular weight ranging from 132 Da to 4400 Da.

Preferably, in the present disclosure, the chemical modifier is fed directly or by dilution.

The auxiliary additives comprise one or more of an antioxidant, a whitening agent, a nucleating agent, and an anti-transesterification agent. More specifically, the antioxidant comprises one or more of butylated hydroxytoluene, RGANOX® 1010, IRGAFOS® 168, and IRGANOX® B 225. More specifically, the whitening agent comprises one or more of Keystone® OB and Keystone® OB-1. More specifically, the nucleating agent comprises one or more of MILLAD® NX8000, MILLAD® 3988, ADK STAB NA-18 and ADK STAB NA-25. More specifically, the anti-transesterification agent comprises one or more of sodium phosphate monobasic and triphenyl phosphite.

By the present method and composition, the hardness, density, and mechanical property of modified thermoplastics are well maintained while still conforming to various standards for different applications including those plastics which are safe for food and beverages because the modifiers and other main components added into the composition for modifying the base thermoplastics according to the present disclosure enable biofouling resistance of the end product or molded article reformed therefrom against fluid biological matters, such as microbes, mammalian cells, proteins, peptides, nucleic acids, steroids and other cellular constituents. Therefore, the final product or molded article derived from molding the final product conforms to relevant standards for food and beverage safety plastics.

The Summary is intended to provide an overview of the present disclosure and is not intended to provide an exclusive or exhaustive explanation. The Detailed Description below is included to provide further information about the present disclosure.

DETAILED DESCRIPTION OF THE PREFERRED EMBODIMENT

Figure 1:
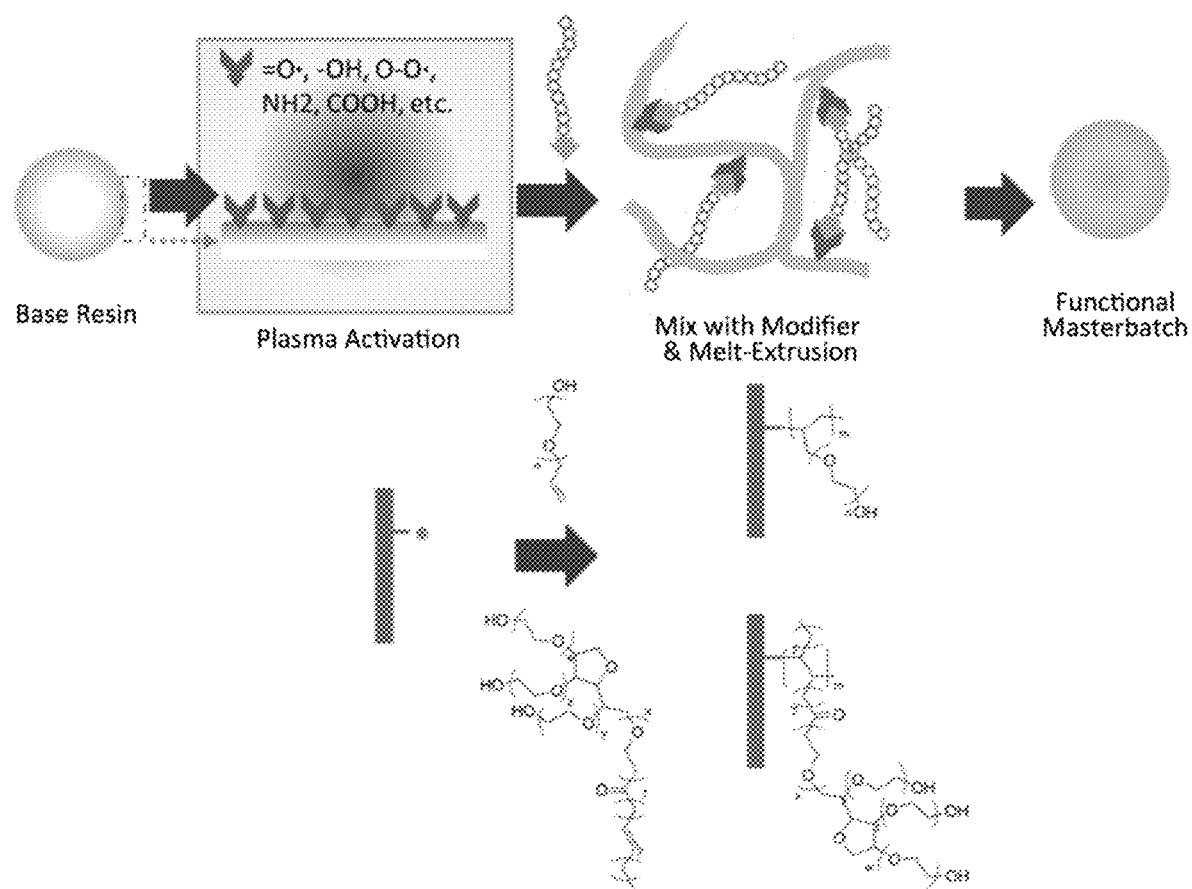
FIG. 1 is a principle schematic diagram of a method of modifying base thermoplastics according to the present disclosure.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

As described herein, the term "a" or "an" is used to include one or more than one and the term "or" is used to refer to a nonexclusive "or" unless otherwise indicated. In addition, it is to be understood that the phraseology or terminology employed herein, without being otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The singular forms "a," "an" and "the" can include plural referents unless the context clearly dictates otherwise.

The term "about" can allow for a degree of variability in a value or range, for example, within 10%, or within 5% of a stated value or of a stated limit of a range.

The term "independently selected from" refers to referenced groups being the same, different, or a mixture thereof, unless the context clearly indicates otherwise. Thus, under this definition, the phrase "X1, X2, and X3 are independently selected from noble gases" would include the scenario where, for example, X1, X2, and X3 are all the same, where X1, X2, and X3 are all different, where X1 and X2 are the same but X3 is different, and other analogous permutations.

The present disclosure is not to be limited in scope by any of the following descriptions. The following examples or embodiments are presented for exemplification only.

Figure 2:
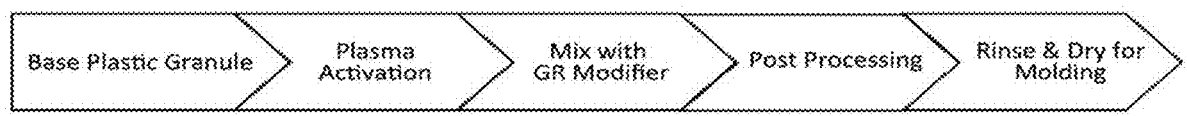
FIG. 2 is a work flow diagram of modifying base thermoplastics using a one-step method and a two-step method provided by the present disclosure.
Figure 2:
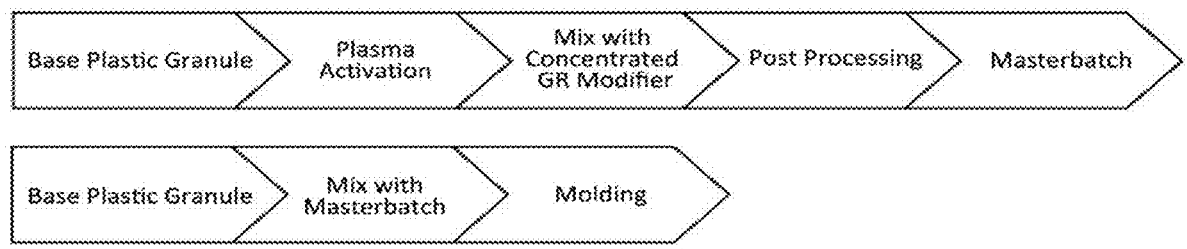

Modification of base thermoplastics according to the present disclosure can be processed in either one-step or two-step method (FIG. 2). The base polymer is firstly activated by plasma prior to being blended and reacted with chemical modifiers and/or without auxiliary additives either before or during mixing and subsequent plasma post treatment to create functional polymer (one-step) or masterbatch (two-step). Representative examples of base thermoplastics include thermoplastic polyurethane (TPU) and thermoplastic vulcanizate (TPV), styrene ethylene butylene styrene block thermoplastic elastomer (SEBS), polypropylene, and polyolefin elastomers (POE). Plasma treatment can be either performed in vacuum plasma or atmosphere plasma with proper source and processing condition. Blending can be achieved on either in a mixer or melt processing such as single/twin-screw extrusion or a Banbury mixing operated with a proper processing temperature window. The extruder can be equipped with an underwater pelletizer to obtain solid standalone or a masterbatch concentrate resin prior to article reforming by injection molding, for example. The processing temperature ranges from 80° C. to 260° C. for base thermoplastics and other main components for modifying the same.

One or more of linear and/or multi-armed structures of non-ionic surfactants is/are selected as the non-fouling modifiers. The non-ionic surfactants are chosen from one or more of fatty alcohol polyoxyalkylene ethers, polyoxyalkylene sorbitan/sorbitol fatty acid esters, polyether glycols and their derivatives. Polyoxyethylene sorbitol hexaoleate, polyoxyethylene sorbitan monolaurate, polyoxyethylene lauryl ether and polyoxyethylene cetyl/stearyl ether, allyl PEG and polyoxyethylene (meth)acrylate are preferred non-fouling modifiers. Proper ratio and combination of functional modifiers is key to the anti-biofouling performance and retention of physical properties of base thermoplastic materials. Typical ratio is adjusted from 0.5 to 10% on a weight basis with respect to the total weight of the composition. In a specific embodiment, the the polyoxyethylene in PEG sorbitol hexaoleate has a molecular weight ranging from 132 to 4,400 Da.

Other additives, such as anti-oxidant, optical brightener, color masterbatch, etc. are chosen to control the appearance and scent of the articles. The anti-oxidant is preferred to be selected from butylated hydroxytoluene, IRGANOX® 1010, IRGANOX® 1076, IRGANOX® 1098, IRGAFOS® 168 or IRGANOX® B 225 with a weight percentage to the total weight of the composition from 0.1 to 1wt %. The brightener is preferred to be selected HOSTALUX® KS, HOSTALUX® KS 1, KEYFLUOR® WHITE OB, KEYFLUOR® WHITE OB-1, KEYFLUOR® WHITE RWP with a weight percentage to the total weight of the composition from 0.01 to 0.05 wt %.

Figure 3:
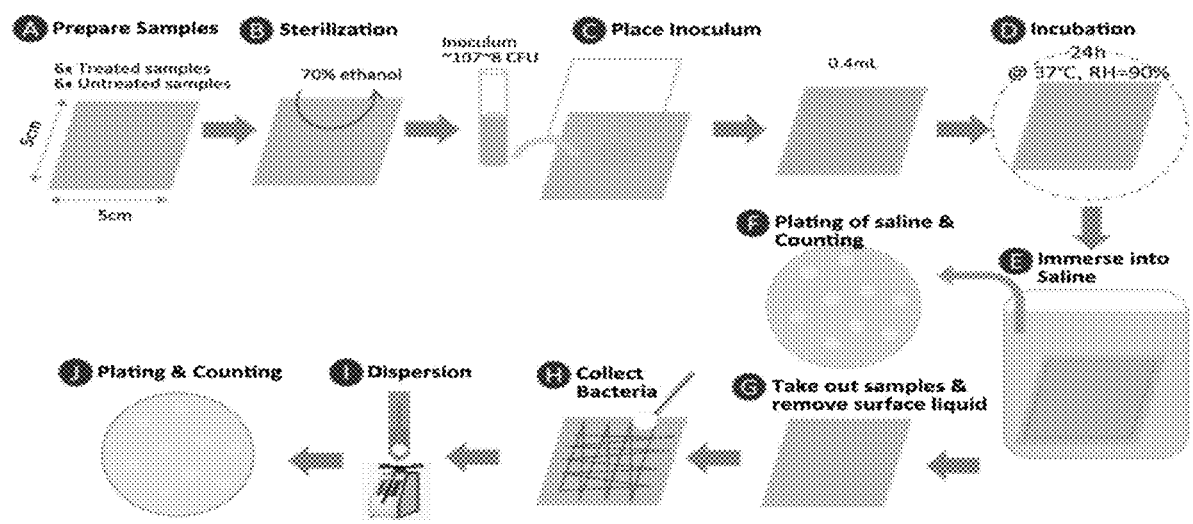
FIG. 3 is a flow diagram of subjecting a sample to a microbial adsorbing test, wherein this flow is based on the revised ISO22196 standard.

The protocol for germ repellent tests on the molded circular plate samples is herein described by the schematic diagram in FIG. 3. The protocol is based on ISO 22196 with modification. The starting inoculum concentration of *E. coli* (ATCC® 8739™) and *S. aureus* (ATCC® 6538P™) was about $8 \times 10^8$ and $8 \times 10^7$ cells/ml in 1/500 NB solution (1/500 NB refers to the 500× diluted Nutrient Broth with pH adjusted to 6.8-7.2) for challenging the sample surface. Result of the adsorption tests are illustrated in the following examples.

The embodiments of the present disclosure can be better understood by reference to the following examples which are offered by way of illustration. The present disclosure is not limited to the examples given herein.

Example 1

This example provides a method of modifying a segmented block copolymer TPU: treating TPU resin with vacuum argon plasma and directly extruding a compound of 96% treated TPU resin with 4% Polysorbate 80 on a weight basis with a processing temperature ranging from 190° C. to 210° C. to obtain functional resin directly. The modified formulation is re-pelletized as standalone resin and post treated with vacuum argon plasma (herein annotated as TPU-M) that can be fed into an injection molding machine (with processing temperature of 210° C.) to obtain plastic samples dictated by the mold tooling design.

With an untreated TPU as a control, testing is carried out with respect to the hardness, density, mechanical performance, and microbial repellent property of the modified TPU-M. Characterization results are summarized in Table 1, wherein the microbial repellent property is directed to the *E. coli* (gram-negative bacteria) and *Staphylococcus aureus* (gram-positive bacteria). Compared with the control (TPU), after being incubated for 24 hours, the residual bacterial counts on the TPU sample surface show a reduction of 99%, such that the TPU-M passes the antibacterial requirement in the revised ISO22196. Meanwhile, the hardness, density and mechanical property of the thermoplastic plastic before and after modification vary little. In other words, the hardness, density, and mechanical performance of the modified thermoplastic plastic are all well preserved.

TABLE 1

| Samples | Hardness (Shore Hardness) | Density (g/cm$^3$) | Izod impact strength (KJ/m$^2$) | Elongation at break (%) | Tensile strength (MPa) | % reduction of *E. coli* adsorption(%) | % reduction of *S. aureus* adsorption (%) |
|---|---|---|---|---|---|---|---|
| TPU | 71 | 1.08 | NB | 832 | 30.04 | — | — |
| TPU-M | 71 | 1.07 | NB | 860 | 29.10 | 99% | 99% |

Example 2

TPV is a PP/EPDM vulcanized system. This example provides a method of modifying TPV: treating TPV resin with vacuum oxygen plasma and extruding a compound of treated 85% TPV resin with 15% polyoxyethylene allyl ether (molecular weight around 1000) on a weight basis with a processing temperature ranging from 190° C. to 200° C. to obtain a functional masterbatch concentrate (herein, annotated as TPV-M) after palletization. The masterbatch was dry blended at a ratio of 1:9 w/w with TPV, during which the atmosphere plasma is applied to the blending system, and subsequently fed into an injection molding machine (with processing temperature of 200° C.) to obtain plastic samples.

With an untreated TPV as a control, testing is carried out with respect to the hardness, density, mechanical performance, and microbial repellent property of the modified TPV-M. Characterization results are summarized in Table 2, wherein the microbial repellency property is directed to the *E. coli* (gram-negative bacteria) and *Staphylococcus aureus* (gram-positive bacteria). Compared with the control (TPV), after being incubated for 24 hours, the remnant bacteria counts on the TPV-M sample surface read a reduction of 99%, such that the TPV-M passes the antibacterial requirement in the revised ISO22196. Meanwhile, the hardness, density and mechanical property of the thermoplastic plastic before and after modification vary little. In other words, the hardness, density, and mechanical performance of the modified thermoplastic plastic are all well preserved.

TABLE 2

| Samples | Hardness (Shore Hardness) | Density (g/cm$^3$) | Izod impact strength (KJ/m$^2$) | Elongation at break (%) | Tensile strength (MPa) | % reduction of E. coli adsorption(%) | % reduction of S. aureus adsorption (%) |
| --- | --- | --- | --- | --- | --- | --- | --- |
| TPV | 69 | 0.95 | NB | 470 | 6.50 | — | — |
| TPV-M | 68 | 0.93 | NB | 492 | 5.98 | >99% | >99% |

Example 3

This example provides a method of modifying SEBS (styrene ethylene butylene styrene block thermoplastic elastomer): treating SEBS resin with vacuum plasma with oxygen and argon as the gas source (flow ratio O$^2$:Ar=3:1), then mixing 80% treated resins with 20% polyoxyethylene cetyl ether on a weight basis in a Banbury mixer with processing temperature ranging from 170° C. to 220° C. The mixture was then transferred to an extruder and sequentially pelletizer to form a functional masterbatch. The masterbatch was dry blended at a ratio of 1:9 w:w with SEBS in a rotary vacuum argon plasma and subsequently fed into an injection molding machine (with processing temperature of 200° C.) to obtain plastic samples.

With the untreated SEBS as a control, testing is carried out with respect to the hardness, density, mechanical performance, and microbial repellent property of the modified SEBS-M. Characterization results are summarized in Table 3, wherein the microbial repellency property is directed to the E. coli (gram-negative bacteria) and Staphylococcus aureus (gram-positive bacteria). Compared with the control, after being incubated for 24 hours, the remnant bacteria counts on the SEBS-M sample surface read a reduction of 99%, such that the SEBS-M passes the antibacterial requirement in the revised ISO22196. Meanwhile, the hardness, density and mechanical property of the thermoplastic plastic before and after modification vary little. In other words, the hardness, density, and mechanical performance of the modified thermoplastic plastic are all well preserved.

TABLE 3

| Samples | Hardness (Shore Hardness) | Density (g/cm$^3$) | Izod impact strength (KJ/m$^2$) | Elongation at break (%) | Tensile strength (MPa) | % reduction of E. coli adsorption(%) | % reduction ofS. aureus adsorption (%) |
| --- | --- | --- | --- | --- | --- | --- | --- |
| SEBS | 46 | 0.88 | NB | 1052 | 7.02 | NA | NA |
| SEBS-M | 44 | 0.90 | NB | 1100 | 6.90 | >99% | >99% |

Example 4

This example provides a method of modifying polypropylene (PP): applying vacuum plasma treatment to PP resins with ambient air as the gas source, then mixing the 97.89% treated resin with 1% of poly(ethylene glycol) sorbitol hexaoleate, 1% polyoxyethylene allyl ether (Mw~1000), 0.1% MILLAD® 3988 and 0.01% Keystone® OB-1 at 80° C. for 30 mins, and applying the vacuum air plasma to the mixture for post-treatment. The treated resins are rinsed by water and dried to form the functional pellets. The dried pellets are then directly subjected to injection molding (with processing temperature of 200° C.) to get molded samples.

With the untreated PP as a control, testing is carried out with respect to the hardness, density, mechanical performance, and microbial repellent property of the modified PP-M. Specific characterization testing results are summarized in Table 4, wherein the microbial repellency property is directed to the Escherichia coli (gram-negative bacteria) and Staphylococcus aureus (gram-positive bacteria). Compared with the control, after being incubated for 24 hours, the remnant bacteria counts on the PP-M sample surface read a reduction of 99%, such that the PP-M passes the antibacterial requirement in the revised ISO22196. Meanwhile, the hardness, density and mechanical property of the thermoplastic plastic before and after modification vary little. In other words, the hardness, density, and mechanical performance of the modified thermoplastic plastic are all well preserved.

TABLE 4

| Samples | Hardness (Shore Hardness) | Density (g/cm$^3$) | Izod impact strength (KJ/m$^2$) | Elongation at break (%) | Tensile strength (MPa) | % reduction of E. coli adsorption(%) | % reduction ofS. aureus adsorption (%) |
| --- | --- | --- | --- | --- | --- | --- | --- |
| PP | 68 | 0.90 | 3.1 | 220 | 34.20 | NA | NA |
| PP-M | 68 | 0.92 | 4.2 | 260 | 32.68 | >99% | >99% |

Example 5

This example provides a method of modifying polyolefin elastomers POE: treating POE resins with vacuum argon plasma, and extruding a compound of 90% treated TPU resin with 10% polyoxyethylene cetyl ether on a weight basis with a processing temperature ranging from 190° C. to 210° C. to obtain functional masterbatch. The masterbatch is dry blended at a ratio of 1:9 w:w with POE in a vacuum air plasma with rotary drum, and subsequently fed into an injection molding machine (with processing temperature of 200° C.) to obtain plastic samples.

With the untreated POE as a control, testing is carried out with respect to the hardness, density, mechanical performance, and microbial repellent property of the modified POE-M. Characterization results are summarized in Table 5, wherein the microbial repellency property is directed to the Escherichia coli (gram-negative bacteria) and Staphylococus aureus (gram-positive bacteria). Compared with the control, after being incubated for 24 hours, the remnant bacteria counts on the POE-M sample surface read a reduction of 99%, such that the POE-M passes the antibacterial requirement in the revised ISO22196. Meanwhile, the hardness, density and mechanical property of the thermoplastic plastic before and after modification vary little. In other words, the hardness, density, and mechanical performance of the modified thermoplastic plastic are all well preserved.

TABLE 5

| Samples | Hardness (Shore Hardness) | Density (g/cm³) | Izod impact strength (KJ/m²) | Elongation at break (%) | Tensile strength (MPa) | % reduction of E. coli adsorption(%) | % reduction of S. aureus adsorption (%) |
|---|---|---|---|---|---|---|---|
| POE | 29 | 0.87 | NB | 852 | 15.2 | NA | NA |
| POE-M | 28 | 0.87 | NB | 900 | 14.4 | >99% | >99% |

Example 6

This example provides a method of modifying thermoplastic polyester elastomers (TPEE): treating TPEE resin/powder with vacuum argon plasma; extruding a compound of 95 wt % treated TPEE resin, 4.4 wt % of polysorbate 80, 0.3 wt % of sodium dihydrogen phosphate and 0.3 wt % of IRGANOX® 1010 at 190~230° C. to obtain modified resin TPEE-M; then, adding the modified resin into an injection molding machine (processing temperature 230° C.) to obtain a plastic sample.

With the untreated TPEE as a control, testing is carried out with respect to the hardness, density, mechanical performance, and microbial repellent property of the modified TPEE-M. Characterization results are summarized in Table 6, wherein the microbial repellency property is directed to the Escherichia coli (gram-negative bacteria) and Staphylococcus aureus (gram-positive bacteria). Compared with the control, after being incubated for 24 hours, the remnant bacteria counts on the TPEE-M sample surface read a reduction of 99%, such that the TPEE-M passes the antibacterial requirement in the revised ISO22196. Meanwhile, the hardness, density and mechanical property of the thermoplastic plastic before and after modification vary little. In other words, the hardness, density, and mechanical performance of the modified thermoplastic plastic are all well preserved.

TABLE 6

| Samples | Hardness (Shore Hardness) | Density (g/cm³) | Izod impact strength (KJ/m²) | Elongation at break (%) | Tensile strength (MPa) | % reduction of E. coli adsorption(%) | % reduction of S. aureus adsorption (%) |
|---|---|---|---|---|---|---|---|
| TPEE | 55 | 1.19 | NB | 350 | 15.0 | NA | NA |
| TPEE-M | 54 | 1.17 | NB | 380 | 14.8 | >99% | >99% |

The examples above are only for clearly illustrating the present disclosure, not for limiting the embodiments of the present disclosure. To a person of normal skill in the art, variations or changes of other different forms may also be made based on the description above. It is unnecessary to exhaust all embodiments herein. Any modifications, equivalent substitutions and improvements within the spirit and principle of the present disclosure should be included within the protection scope as limited in the claims of the present disclosure.

What is claimed is:

1. A method for preparing modified thermoplastics having a germ-repellent property, comprising:
   (a) providing base thermoplastics;
   (b) treating the base thermoplastic with plasma to obtain treated thermoplastics;
   (c) directly melt-extruding the treated thermoplastics with a chemical modifier with/or without additives to form a masterbatch of modified thermoplastics.

2. The method for preparing modified thermoplastics having a germ-repellent property according to claim 1, wherein said base thermoplastics is selected from a group consisting of homopolymers, copolymers and blends of polyolefins, cyclic polyolefins, acrylics, acetates, styrenics, polyesters, polyimides, polyaryletherketones, polycarbonates, polyurethanes and thermoplastic elastomers.

3. The method for preparing modified thermoplastics having a germ-repellent property according to claim 1, wherein said base thermoplastics is selected from a group consisting of poly(methyl methacrylate) (PMMA), polystyrene (PS), polyethylene terephthalate (PET), polycarbonate (PC), polymethylpentene (PMP), polysulfone, polyamide (PA), polyvinyl chloride (PVC), styrene acrylonitrile (SAN), styrene-methacrylate based copolymer, polypropylene based copolymer, acrylonitrile butadiene styrene (ABS), polyimide (PI) cellulosic resins, methyl methacrylate butadiene styrene (MBS), thermoplastic polyurethane (TPU), styrene ethylene butylene styrene block thermoplastic elastomer (SEBS), polyolefin elastomers (POE), thermoplastic polyester elastomers (TPEE), and thermoplastic vulcanizates (TPV).

4. The method for preparing modified thermoplastics having a germ-repellent property according to claim 1, wherein a form of said thermoplastics is selected from a group consisting of powder, granule, flake and filament.

5. The method for preparing modified thermoplastics having a germ-repellent property according to claim 1, wherein in step (b) and step (d), said plasma includes atmosphere plasma or vacuum plasma; and/or said plasma is formed from a gas selected from a group consisting of oxygen, argon, nitrogen, carbon dioxide and combinations thereof; and/or a duration of plasma treatment ranges from 10 s to 600 s, and/or power of plasma treatment ranges from 10 W to 1000 W.

6. The method for preparing modified thermoplastics having a germ-repellent property according to claim 1, wherein in step (c), said chemical modifier is selected from a group consisting of one or more of linear and/or multi-armed structures of non-ionic surfactants.

7. The method for preparing modified thermoplastics having a germ-repellent property according to claim 6, wherein said non-ionic surfactants are one or more selected from a group consisting of fatty alcohol polyoxyalkylene ethers, polyoxyalkylene fatty acid esters, polyoxyalkylene sorbitan/sorbitol fatty acid esters, polyether glycols and their derivatives.

8. The method for preparing modified thermoplastics having a germ-repellent property according to claim 7, wherein said non-ionic surfactants, each having a polyoxyethylene moiety, are one or more selected from a group consisting of polyoxyethylene sorbitol hexaoleate, polyoxyethylene sorbitan monolaurate, polyoxyethylene hydrogenated castor oil and polyoxyethylene cetyl/stearyl ether, and their derivatives; or said non-ionic surfactants are one or more selected from a group consisting of polyoxyethylene acrylate, polyoxyethylene methacrylate, and polyoxyethylene vinyl ethers; or said non-ionic surfactants, each having a polyoxypropylene moiety, are one or more selected from a group consisting of polyoxypropylene glycol, polyoxypropylene amine and polyoxypropylene acrylate, polyoxypropylene methacrylate, polyoxypropylene glycerol ether and their derivatives.

9. The method for preparing modified thermoplastics having a germ-repellent property according to claim 8, wherein the polyoxyethylene moiety or polyoxypropylene moiety has a molecular weight ranging from 132 Da to 4400 Da.

10. The method for preparing modified thermoplastics having a germ-repellent property according to claim 1, wherein in step (c), said chemical modifier is in standalone form or diluted form.

11. The method for preparing modified thermoplastics having a germ-repellent property according to claim 1, wherein in step (c), the masterbatch of modified thermoplastics comprises treated thermoplastics at 70-99 wt %, chemical modifiers at 0.5-29 wt %, and other additives at 0.01-1 wt %.

12. The method for preparing modified thermoplastics having a germ-repellent property according to claim 1, further comprising (d) applying post-treatment with plasma to the masterbatch of modified thermoplastics.

13. The method for preparing modified thermoplastics having a germ-repellent property according to claim 1, wherein in step (c), said melt-extruding is either performed via a twin-screw extruder, a Banbury mixer or other heat-assisted blend process and subsequently pelletized into a granule form.

14. The method for preparing modified thermoplastics having a germ-repellent property according to claim 1, wherein in step (c), additives are added to be blended with the treated thermoplastics and chemical modifiers, said additives being selected from a group consisting of an antioxidant, a brightener, a nucleator and an anti-transesterification.

15. The method for preparing modified thermoplastics having a germ-repellent property according to claim 1, wherein said step (d) further comprises rinsing the composition after said post-treatment.

16. The method for preparing modified thermoplastics having a germ-repellent property according to claim 15, wherein said rinsing is performed by employing water, ethanol, centrifugation and compressed air to remove unlinked surface modifiers.

17. A method for preparing a product having a germ-repellent property, comprising: (e) providing base thermoplastics; (f) providing the masterbatch of modified thermoplastics made according to claim 1; (g) blending the base thermoplastic with the masterbatch of modified thermoplastics to form a mixture; (h) molding said mixture into an article with a desired shape and dimension.

18. The method for preparing a product having a germ-repellent property according to claim 17, wherein said molding is selected from profile extrusion, injection molding, blow molding, blow filming, film casting, spinning and overmolding on a plastic substrate.

19. The method for preparing a product having a germ-repellent property according to claim 17, wherein step(h) is performed with a molding temperature from 170° C. to 260° C.

* * * * *